(12) United States Patent
Yoshida et al.

(10) Patent No.: US 7,343,343 B1
(45) Date of Patent: Mar. 11, 2008

(54) ELECTRONIC GOODS-PURCHASING METHOD AND COMMERCIAL-TRANSACTION APPARATUS THEREFOR

(75) Inventors: Jun Yoshida, Tokyo (JP); Kazuo Imai, Tokyo (JP); Hideto Hamada, Tokyo (JP)

(73) Assignee: Sony Corporation (JP)

( * ) Notice: Subject to any disclaimer, the term of this patent is extended or adjusted under 35 U.S.C. 154(b) by 712 days.

(21) Appl. No.: 09/830,742

(22) PCT Filed: Aug. 30, 2000

(86) PCT No.: PCT/JP00/05884

§ 371 (c)(1),
(2), (4) Date: Aug. 3, 2001

(87) PCT Pub. No.: WO01/16822

PCT Pub. Date: Mar. 8, 2001

(30) Foreign Application Priority Data

Sep. 1, 1999 (JP) ............................... P11-247620

(51) Int. Cl.
*G06Q 40/00* (2006.01)
(52) U.S. Cl. .......................................... 705/38; 705/35
(58) Field of Classification Search .................. 705/35, 705/36, 38
See application file for complete search history.

(56) References Cited

U.S. PATENT DOCUMENTS 5,732,400 A * 3/1998 Mandler et al. ............... 705/26
6,092,202 A * 7/2000 Veil et al. .................... 713/201

2005/0102188 A1 * 5/2005 Hutchison et al. ............ 705/26

FOREIGN PATENT DOCUMENTS

| EP | 0845749 | 6/1998 |
| JP | 6-12428 | 1/1994 |
| JP | 9-16682 | 1/1997 |
| JP | 9-502819 | 3/1997 |
| JP | 10-510638 | 2/1998 |
| JP | 10-162066 | 6/1998 |
| JP | 11-143959 | 5/1999 |
| JP | 11-161717 | 6/1999 |
| JP | 11-296580 | 10/1999 |
| WO | 95/06294 | 3/1995 |
| WO | 95/26004 | 9/1995 |
| WO | WO9907121 | * 2/1999 |
| WO | 99/13424 | 3/1999 |

OTHER PUBLICATIONS

U.S. Appl. No. 60/140,039.*
Kahn, Fritz R. "Freight Payments: Give Yourself Some Credit". Chilton's Distribution. Radnor: Nov. 1986. vol. 85, Iss. 11; p. 60.*

* cited by examiner

*Primary Examiner*—Lalita M. Hamilton
(74) *Attorney, Agent, or Firm*—Lerner, David, Littenberg, Krumholz & Mentlik, LLP

(57) ABSTRACT

A method for purchasing an item using a terminal apparatus connected to a supplier server through a communication line. The method includes accumulating data associated with a user request to purchase an item at the supplier server. The supplier server contacts a credit company server to obtain a credit contract associated with the user request. The credit company server may then send a credit contract to the user, if the user is authorized to receive credit. Another aspect provides a method for electronic purchase of a good. This method includes selecting a credit payment method for the good being purchased using a user terminal coupled to a server. The server then determines payment options associated with the credit payment method.

17 Claims, 7 Drawing Sheets

FIG. 4

THE FOLLOWINGS ARE THE ITEMS OF CONTENTS WE'VE REGISTERED ALREADY ABOUT YOU. DISPLAYS ARE BEING MADE OF THE ITEMS OTHER THAN THOSE ON WHICH NO CHANGES OCCUR. IF ANY CHANGES OCCUR CORRECT BY OVERWRITING. IF NO CHANGES OCCUR CLICK THE CONFIRMATION BUTTONS AT THE LEFTS OF THE RELEVANT ITEMS.

- ☐ NAME (HALF-WIDTH) KANA — FAMILY NAME [ ] FIRST NAME [ ]
- ☐ NAME (KANJI) — FAMILY NAME [ ] FIRST NAME [ ]
- ☐ SPOUSE — ○ EXISTS ○ NOT EXISTS
- ☐ ADDRESS OF YOUR HOME — 〒 [ ] – [ ]
  [ ]
  [ ]
- ☐ TELEPHONE NUMBER — YOUR HOME'S ○ PHONE USE ○ ANOTHER'S PHONE
  [ ] – [ ] – [ ]
- ☐ YOUR PLACE OF EMPLOYMENT (HALF-WIDTH KANA)
  [ ]
- ☐ THE PHONE NUMBER OF YOUR PLACE OF EMPLOYMENT
  [ ] – [ ] – [ ]
- ☐ LOCATION OF YOUR PLACE OF EMPLOYMENT — 〒 [ ] – [ ]
  [ ]
  [ ]
- ☐ LENGTH OF YOUR SERVICE [ ] YEAR [ ] MONTH
- ☐ FORM OF YOUR RESIDENCE ○ HOUSE YOU LIVE IN ALONE ○ HOUSE YOU LIVE IN WITH FAMILY ○ COMPANY HOUSE ○ PUBLIC DWELLING ○ CONDOMINIUM ○ RENTAL ○ UNIT RENTED HOUSE ○ APARTMENT HOUSE ○ DORMITORY ○ ANY OTHER
- ☐ LENGTH OF RESIDENCE [ ] YEAR [ ] MONTH
- ☐ ACCOUNT PREVIOUSLY USED BY YOU — ○ NAME OF THE BANKING SYSTEM [ ]

※ YOU HAVE TRANSACTIONS WITH IF YOU CHANGE THE BANKING SYSTEM TO ANY OTHER CLICK THE BUTTON "CHANGE"

◎. IF YOU REQUEST THE CONCLUSION OF [ ] YOUR CREDIT CONTRACT UNDER THE ITEMS OF CONTENTS ABOVE CLICK THE BUTTON "CONFIRM" [CONFIRM]

ELECTRONIC GOODS-PURCHASING METHOD AND COMMERCIAL-TRANSACTION APPARATUS THEREFOR

TECHNICAL FIELD

The present invention relates to an electronic goods-purchasing method and commercial-transaction apparatus, which are suitably applied when doing on-line shopping, for example, on an Internet communication network.

BACKGROUND ART

Conventionally, using, for example, a personal computer that is equipped in each home, access is had to a home page for use for on-line shopping via an Internet communication network. And, an order to purchase goods that have been introduced at the home page is made. By purchasing goods through the utilization of the on-line shopping, the user can purchase various kinds of merchandise in the state of staying in his home.

The methods for payment of the price of the goods the user has made his order to buy on this on-line shopping generally include the following. The method of using a credit card, the method of paying cash in exchange for a receipt when the goods have been delivered, and the method of making remittance through the use of a bank account.

By the way, the above-described conventional method for payment on the on-line shopping was in any case basically the one in which the goods-item was paid for at one time in one lump sum. Therefore, the user had the difficulty of freely choosing the terms of payment such as choosing a payment on the easy payment plan. When using a credit card, there is also a case where the user can adopt an easy payment plan that is determined in advance by the credit-card operating company. But there was the problem that the user could only adopt a pre-determined easy payment plan. Also, in case the user had no such a credit card, there was also the problem of any credit card being impossible to utilize.

Ordinarily, on the side of a company that performs its easy payment plan execution business such as an easy payment business (in this specification this company is defined as being a credit company), it needs to have a user, who desires to make his easy payment, write necessary particulars into a written contract for credit. For this reason, so long as concerning the Internet process including a process for on-line shopping, the exchange of the contract in writing between the both parties was difficult. This resulted in a failure to realize the easy payment plan.

Also, even in case performing the easy payment plan through the use of a credit card, the user simply performs the operation of selecting the easy payment on the screen of his computer with respect to which he performs his purchasing operation. As a result, there was the problem that how exactly the user had actually to pay was unknown to him until he received a bill for the use of the credit card. Similarly, in the case of a credit contract made by the user with a credit company, the amounts billed widely vary according to the payment conditions. Therefore, when requesting the payment on-credit during the on-line shopping, the user had a desire to know the sum total of the amounts billed beforehand.

Further, when performing the on-line shopping by using a computer set (hereinafter referred to as "a computer apparatus"), the user needs to input with regard to many particulars including name, address, and payment conditions. This raised the problem that the user's purchasing operation required a large amount of time.

DISCLOSURE OF THE INVENTION

A first object of the present invention is when performing on-line shopping to enable the user to simply perform his input operation.

A second object of the present invention is when performing on-line shopping to enable the user to perform a payment on-credit that needs the use of a written contract.

A third object of the present invention is when performing on-line shopping to enable the user to simply understand the state of payment in that the price is paid on the condition that the user has set.

The first aspect of the invention provides a method of electronically purchasing an item of goods, the method of electronically purchasing an item of goods being adapted to purchase an item of goods by means of a terminal apparatus connected to a server through a prescribed communication line, in which the server accumulates data regarding the user who has purchased an item of goods; and when the user has performed his purchasing operation for purchasing the item of goods through the operation of the terminal apparatus and when data regarding the user who has performed his purchasing operation is accumulated on the server, it has been arranged that, using the accumulated data, there is performed setting for performing the payment of the purchased-goods-item price.

According to the first aspect of the invention, in case the user who purchased an item of goods through the utilization of the same server before purchases an item of goods, there is performed setting for the performance of the payment of the purchased goods-item price through the re-utilization of the data at the time of the previous purchase.

The second aspect of the invention provides a method of electronically purchasing an item of goods, the method of electronically purchasing an item of goods being adapted to purchase an item of goods by means of a terminal apparatus connected to a server through a prescribed communication line, in which when a credit payment has been selected at the time of the user's purchasing operation for purchasing an item of goods on the terminal apparatus, the server requests the user who operates the terminal apparatus to send a written contract of credit; at the time when the written contract has been returned according to the server's request, the server formally accepts the order of the item of goods the purchasing operation of that has been performed by the user; and when the user operating the terminal apparatus is the one who was already contracted to the server by way of a written contract of credit, the server formally accepts the order of the item of goods the purchasing operation of that has been performed without requesting the user to send the written contract.

According to the second aspect of the invention, when purchasing an item of goods with the payment on-credit, first the exchanges of the written contract are performed. Thereafter, the item of goods is formally order-accepted. In addition, in case the user who was contracted to the server before through the conclusion of the written credit contract purchases an item of goods, this item of goods is order-accepted without the exchanges of the written contract being made between the both parties.

The third aspect of the invention provides a method of electronically purchasing an item of goods, the method of electronically purchasing an item of goods being adapted to purchase an item of goods by means of a terminal apparatus connected to a server through a prescribed communication line, in which when an on-credit payment has been selected through the user's purchasing operation of an item of goods by the terminal apparatus, a simulated result of the state of payment made with respect to the price of the item of goods purchased is displayed on the screen of the terminal apparatus; and after the display of the simulated result, the server causes the user to finally decide the purchase of the item of goods.

According to the third aspect of the invention, when purchasing an item of goods with an on-credit payment, there is performed beforehand simulation of the state of payment made on credit. The server thereby causes the user to confirm the amounts paid, payments date, etc. The server thereafter enables finally establishing the purchase.

The fourth aspect of the invention provides a method of electronically purchasing an item of goods, the method of electronically purchasing an item of goods being adapted to perform the purchasing operation for purchasing an item of goods by means of a terminal apparatus connected to a server through a prescribed communication line, which includes the step in which the server has beforehand within a database file it possesses inside itself data that regards the user who has performed his purchasing operation by the use of the terminal apparatus; the step in which when the user has performed his purchasing operation by the use of the terminal apparatus the server searches whether the data regarding the user exists in the database file; and the step in which in case the data regarding the user exists within the database file, the server performs its goods-item order accepting procedures by the use of that data regarding the user.

The fifth aspect of the invention provides a method of electronically purchasing an item of goods, the method of electronically purchasing an item of goods being adapted to perform the purchasing operation for purchasing an item of goods by means of a terminal apparatus connected to a server through a prescribed communication line, which includes the step in which the server has beforehand within a database file it possesses inside itself data that regards the user who has performed his purchasing operation by the use of the terminal apparatus; the step in which when the user has performed his purchasing operation by the use of the terminal apparatus, the server searches whether the data regarding the user exists in the database file; the step in which in case the data regarding the user does not exist within the database file, the server sends to the user a price-payment written contract following the purchase of the item of goods; and the step in which in case the data regarding the user exists within the database file, the server performs its goods-item order accepting procedures by the use of that data regarding the user by omitting the procedure of sending the price-payment written contract.

The sixth aspect of the invention provides a method of electronically purchasing an item of goods, the method of electronically purchasing an item of goods being adapted to perform the purchasing operation for purchasing an item of goods by means of a terminal apparatus connected to a server through a prescribed communication line, which includes the step in which the server requests the user, who has performed his purchasing operation by the use of the terminal apparatus, to input the price payment terms for his purchased item of goods; and the server shows to the user, according to the price payment terms input in that step, the circumstances where the price of the item of goods, with respect to that the user has performed his purchasing operation, is paid.

The seventh aspect of the invention provides a commercial-transaction apparatus, the commercial-transaction apparatus being adapted to perform a goods-item order acceptance procedure according to the user's goods-item purchasing operation that is performed from a terminal apparatus connected to the server via a prescribed communication line, which includes storage means for holding beforehand data regarding the user who has performed his purchasing operation by the use of the terminal apparatus; search means for searching, when the user has performed his purchasing operation by the use of the terminal apparatus, whether the data regarding the user exists within the storage means; and goods-item order acceptance procedure means for, in case the data regarding the user exists within the storage means, performing the goods-item order acceptance procedure by the use of the data regarding the user.

The eighth aspect of the invention provides a commercial-transaction apparatus, the commercial-transaction apparatus being adapted to perform a goods-item order acceptance procedure according to the user's goods-item purchasing operation that is performed from a terminal apparatus connected to the server via a prescribed communication line, which includes storage means for holding beforehand data regarding the user who has performed his purchasing operation by the use of the terminal apparatus; search means for searching, when the user has performed his purchasing operation by the use of the terminal apparatus, whether the data regarding the user exists within the storage means; written-contract production means for, in case the data regarding the user does not exist within the database file, producing a price-payment written contract that follows the purchase of the item of goods; and goods-item order acceptance procedure means for, in case the data regarding the user exists within the database file, the server performs its goods-item order accepting procedures by the use of that data regarding the user by omitting the operation of producing the price-payment written contract with use of the written-contract production means.

The ninth aspect of the invention provides a commercial-transaction apparatus, the commercial-transaction apparatus being adapted to perform a goods-item order acceptance procedure according to the user's goods-item purchasing operation that is performed from a terminal apparatus connected to the server via a prescribed communication line, which includes input-requesting means for requesting the user, who has performed his purchasing operation by the use of the terminal apparatus, to input the price payment terms for purchasing the item of goods; and payment circumstances presentation means for presenting to the user, according to the price payment terms that have been input in that input-requesting means, the circumstances where the price of the item of goods, with respect to that the user has performed his purchasing operation, is paid.

BRIEF DESCRIPTION OF THE DRAWINGS

FIG. 4 is an explanatory view illustrating an example of the display screen according to the embodiment of the present invention.

BEST MODE FOR CARRYING OUT THE INVENTION

An embodiment of the present invention will hereafter be explained with reference to FIGS. 1 to 6.

In this embodiment, it is premised that a user's side owns a personal computer set; a trader's side has established a home page through which the user performs on-line shopping (hereinafter this trader is referred to as "a supplier"); and the user's computer set is connected to the trader's side through an Internet communication network, whereby the user purchases goods by way of the trader's home page.

Figure 1:
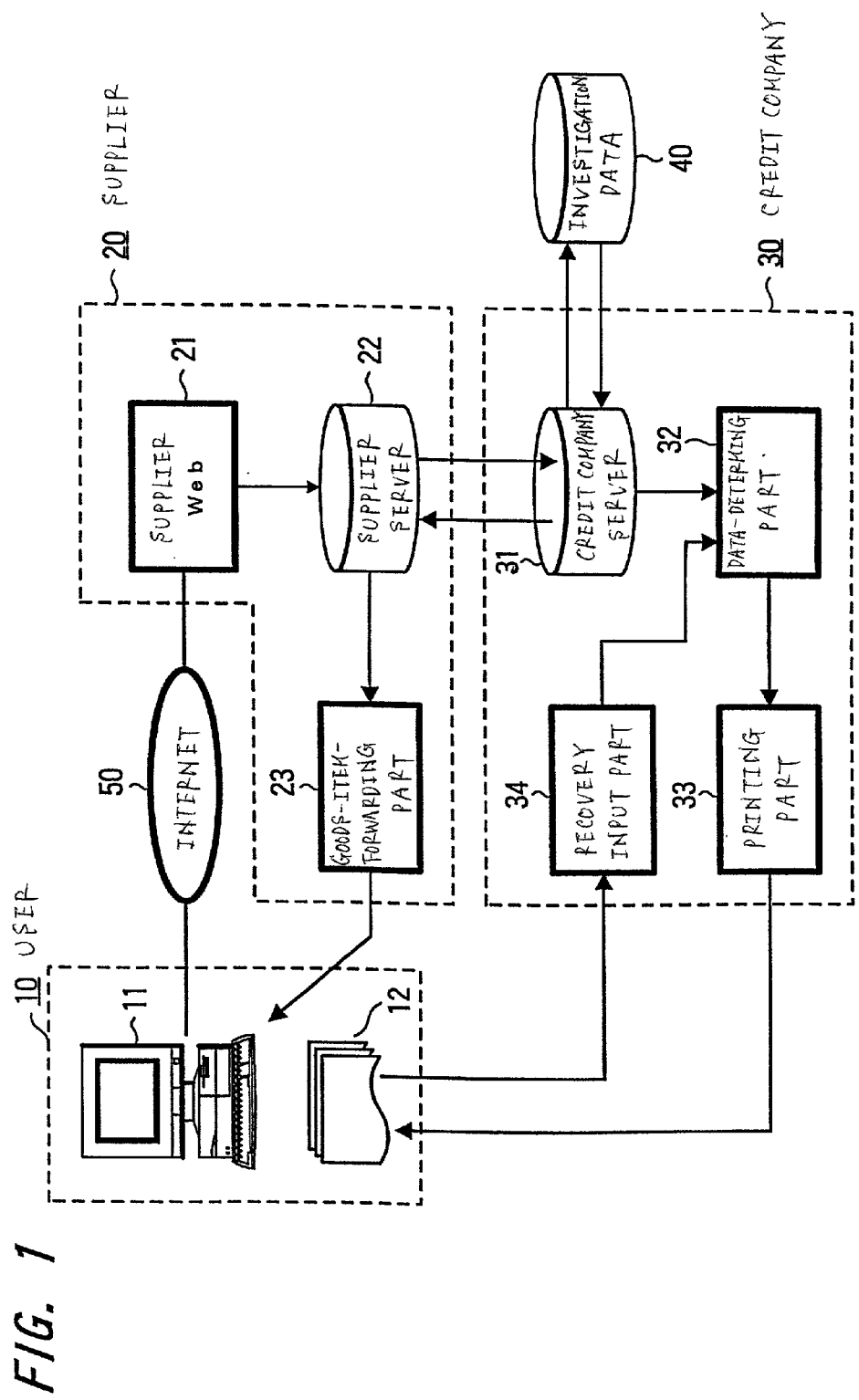
FIG. 1 is a block diagram illustrating an example of the system construction according to an embodiment of the present invention.

FIG. 1 is a view illustrating the construction of the entire system. As a user's side facility 10, there is provided a personal computer set or apparatus (a terminal apparatus) 11 that can be connected to an Internet communication network 50 via a telephone line or the like. This personal computer apparatus 11 can make data transmission between itself and a server, which is connected thereto through the Internet 50, by way of, for example, a keyboard operation performed by the user. At the same time, data that has been transmitted from the server can be displayed on a display that is equipped to the personal computer apparatus 11. It is to be noted that other terminal apparatus, capable of being connected to the Internet, than the personal computer apparatus, may also be used instead of this personal computer apparatus 11.

As a supplier's side facility 20, a Web (site) 21 the supplier has established and a supplier's side server 22 that can supply data to the Web (site) 21 are provided so that each of them may be connected to the Internet 50. Here, it is defined that the Web (site) 21 represents both of the so-called "Web server" itself that displays a prescribed picture image (home page) according to the request made by the terminal apparatus such as the personal computer apparatus 11 and the picture image (home page) that is displayed by this "Web server".

In the server 22, there are accumulated data necessary for the performance of the on-line shopping, the user's information used when he purchased goods in the past, etc. And, in the supplier's side facility 20, there is prepared a goods-forwarding part 23 that forwards an item of goods that has been purchased, on the basis of the data that has been accumulated on the server 22. This goods-forwarding part 23 is equipped with a terminal apparatus that when for example a request to purchase an item of goods has been made with respect to the server 22 via the Web (site) 21 prints out a list of the requested goods items or a list of the purchasers. The persons who carry out the forwarding operation according to the thus printed-out list take charge of the forwarding operation for the relevant items of goods.

Also, the price collection business that is concerned here with the on-line shopping is arranged to be performed by a prescribed credit company that has previous contract with the supplier. It is arranged that the server 22 of the supplier's side makes bi-directional communication with a server 31 within the credit company's side facility 30. Between the supplier's side server 22 and the credit company's side server 31 it is arranged that, using for example a single-purpose communication line, data transfer is made under relevant transfer protocol (FTP). When the request made by on-line shopping exists on the supplier's side server 22, it is arranged that the supplier's side server 22 performs data transmission with the credit company's side server 31 to thereby have its relevant purchase of credit approved by the latter 31. Also, when executing a simulation regarding the payment made on requested credit, as well, data transmission is performed between the supplier's side server 22 and the credit company's side server 31. It is thereby arranged that the supplier's side server 22 obtains the data of the simulated result. The detail on the process for obtaining the approval from the credit company, or the detail on the process for simulation will be described later.

On the credit company's side server 31 there is accumulated data necessary for the performance of the credit process. There is also accumulated data that regards the credit users in the past. In connection with this, in the case of the system construction of FIG. 1, the supplier 20 and the credit company 30 are in 1:1 correspondence with each other. However, actually, there is a case where a plurality of suppliers make common use of one credit company. On the credit company's side server 31, a relevant commission and a relevant interest rate are set for each supplier and there are accumulated data that regard such settings. Also, even inside one supplier, in case a special commission or interest rate is set every item of goods, the data on such settings as well are accumulated on the server 31.

The data that has been processed within the server 31 has the determining operation therefor performed by a computer apparatus that has been set so as to perform the operation a data-determining part 32 is pre-determined to perform. In the data-determining part 32, there are determined the individual particulars in every processing that are included from the request for using the on-credit payment to the completion of the contract. Here, to the computer apparatus constituting the data-determining part 32 there is connected a printer apparatus constituting a printing part 33. Thereby, when a request for using the on-credit payment has been newly made with respect to the credit company's side server 31, it is arranged that the written contract regarding the contents of that requested on-credit payment be printed out from the printing part 33. Then, the thus printed-out written contract is sent to the user 10 who has made his request for on-credit payment.

The written contract that has been sent to the user 10 has its necessary particulars, e.g. the user's signature, written thereon. Then, it is returned to the sender, credit company 30's side. At this time, the return-mailed written contract is recovered via a terminal apparatus constituting a recovery/input part 34 prepared on the credit company 30's side. As a result, the fact that the contract the particulars of that were properly written on has been obtained is input to the part 34 as data. In the data-determining part 32, when it has been determined therein that this input of the data on the written contract has been done, it is arranged to transmit the data to that effect from the credit company's side server 31 to the supplier's server 22.

Also, it is constructed that the credit company's side server 31 performs communication with a database 40, via a single-purpose line, which possesses the credit investigation data on the circumstances where credit is put to practical use. According to the data that has been accumulated on the database 40, it is possible to check the credit information on the user who has requested the utilization of his on-credit payment. This database 40 has the following two types. One is the type that has been installed within the credit company. The other is the type that shares the data together with another credit company.

Next, in the above-explained system construction, the process will be explained which is executed when purchasing goods by connecting the use 10's side computer apparatus 11 to the supplier 20's side Web (site) 21 via the Internet 50.

Figure 2:
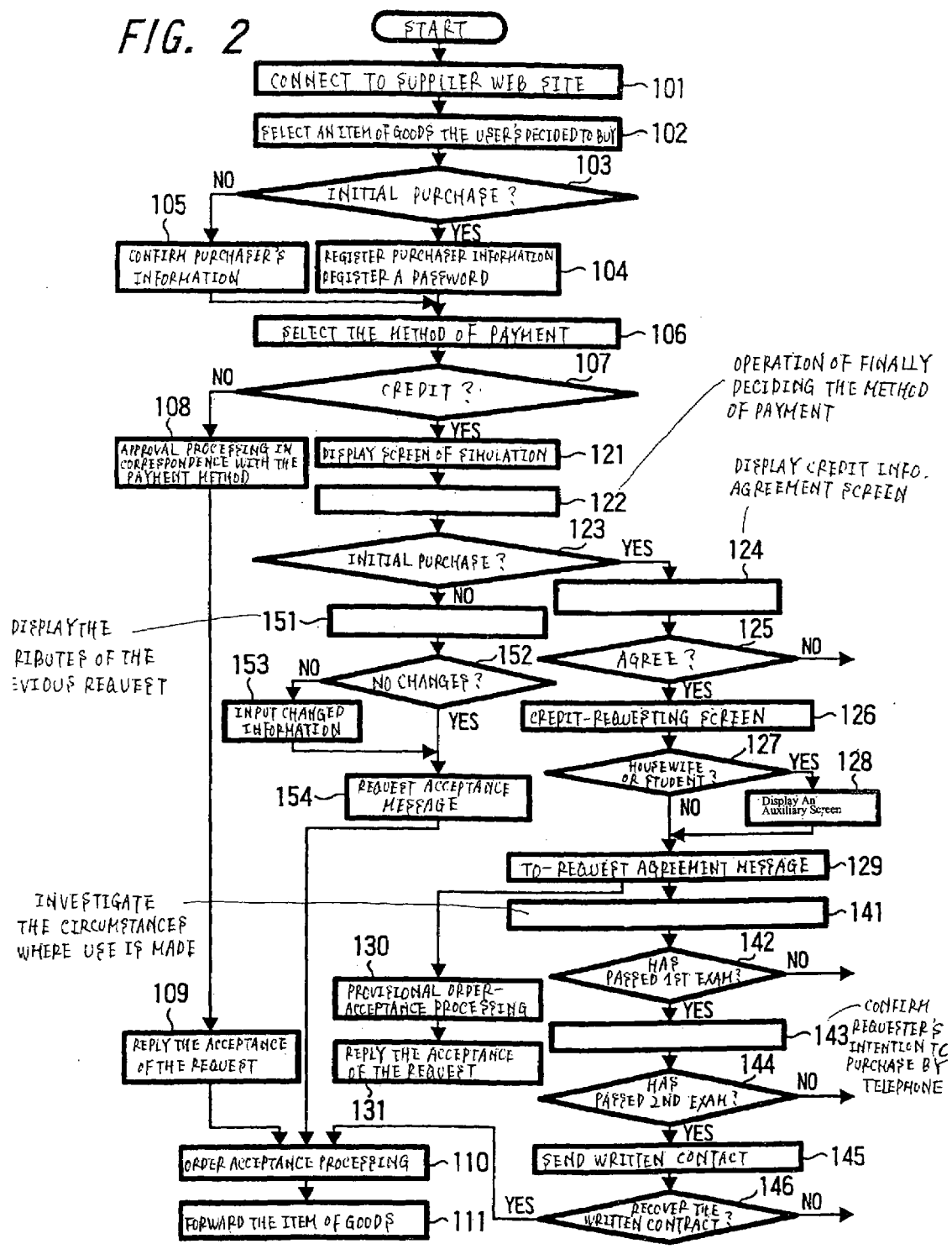
FIG. 2 is a flow chart illustrating an example of the goods-item purchase process according to the embodiment of the present invention.

FIG. 2 is a flow chart illustrating the entire process from the request for purchase of goods to the forwarding of this item of goods. An explanation will hereafter be given of the process through the use of the flow chart of FIG. 2. First, the user 10's side computer 11 is connected to the supplier's side Web 21 via the Internet 50 (step 101). The user operates the computer apparatus 11, looks through the home page prepared as the Web 21, and selects an item of goods he's decided to buy (step 102). When performing this purchasing operation for an item of goods, data is transmitted from the Web 21 to the computer apparatus 11. Thereby, an image screen for permitting input of the information necessary for purchase is displayed on the display of the computer apparatus 11.

At this time, as the image screen initially displayed there is displayed (step 103) an image screen that inquires about whether it is for the first time that the user purchases an item of goods by on-line shopping through this supplier 20. Then, in case it has been determined that the purchasing of goods is for the first time according to the user's input operation on that image screen, an image screen permitting input of the information necessary for purchase is displayed. Thereby, the supplier 20's side obtains necessary information. It simultaneously registers a password that will be needed for purchase made from the next onward (step 104). As the information necessary for purchase, there is information the supplier requires to use, which has been selected from among the following items of information. They include, for example, purchaser's name, address, date of birth (or age), phone number, place of employment's name; address; and phone number, existence or non-existence of spouse, and family members number. The supplier causes the user to input that information.

Incidentally, regarding the account for debit authorization, e.g. the number of the user's bank account he for example has at this bank, it usually is the item that should be mentioned in a written account-transfer request. Therefore, that is not the item essentially required to be input here. However, the supplier may request the input on condition that the network security between the user and the supplier be ensured in the form of a mortgage. It then may print the account number when separately sending the written account-transfer request to the user. In addition having omitted actual sending/recovery of the written account-transfer request on condition that any limitations under the relevant laws be taken away, it is also possible to add the account number to the items essentially required to be input.

Also, when it has been determined through the input operation in step 103 that the purchase is not for the first time the supplier causes the user to input his partial data (e.g. name or phone number) and his password. And when those input data such as name and password have coincided with each other on the server 22 side, the purchaser's information that has been registered by way of the password is displayed on the image screen of the user's side computer apparatus 11 and the purchaser's information is confirmed (step 105). Regarding the information that at the time of this confirmation is displayed on the screen of the computer apparatus 11, only the information alone that might be changed is displayed. For instance, only the information alone that might be corrected, such as name, address, phone number, or place of employment, is displayed, while information having no possibility of being changed such as the date of birth is not displayed.

Regarding the password, it is constructed of, for example, the following three parts. A first part is the one that is constructed of a several-digit numeral that is specific for each user. A second part is the one that is constructed of a several-digit numeral that is set for each supplier. And a third part is the one that is represented by a check code that is produced from data consisting of the numeral at the first part and the numeral, added thereto, at the second part. To the user, the supplier informs the first and the third part as the password. The data that corresponds to the second part is made non-public. There is no need to inform to the user the second part constructed of the numeral set for each supplier. However, it is possible that the same user will purchase on credit with respect to a plurality of suppliers. Therefore, it is possible to take measures of informing to the user as the password the check code corresponding to the third part together with the first-part several-digit numeral that is specific for each user. It thereby becomes possible to reliably specify the user who is a relevant purchaser.

Upon completion of the registration processing in step 104 for the information of the purchaser or the confirmation processing in step 105 for the information of the purchaser, a selection screen for the method of payment is displayed. The supplier thereby causes the user to select his method of payment (step 106). Here, as the payment method that is selectable there are various kinds of payment methods that have hitherto been executed at the time of the on-line shopping. They include payment into a bank, etc. account, payment of cash in exchange for a receipt when an item of goods has been delivered, payment at a convenience store, payment based on the use of a credit card, and on-the-spot cashing from the bank account with a cash card. The selectable payment method additionally includes payment on-credit. In the case of credit payment, it includes the payment on a given-number-of-time easy payment plan, the payment in one lump sum from bonus, the payment made twice from bonus, and the revolving payment. It is to be noted that the payment on-credit here does not include the payment made using a credit card.

In the case of the payment that among the credit payments is made on the easy payment plan, it is arranged that as the times for dividing the term of the payment the user can select a given number of times from among the pre-determined division times such as 3 times, 6 times, 12 times, etc. It is also arranged that additional payment of an amount of money larger than pre-determined on a divisional basis can be made in a bonus month. The revolving payment is the method of payment in which the amount of money paid per month is made fixed as determined in advance. These payments on-credit are basically the payment methods each of that needs to have the purchaser sign the written contract.

Upon completion of the selection of the payment method in step 106, the process based on the payment method selected above is executed. This process that is concerned with the payment is executed in the credit company's side server 31 by necessary data being transferred from the supplier's side server 22 to the credit company's side server 31.

First, it is determined whether the selected payment method is on credit (step 107). In case other payment method than on credit has been selected, there is executed the approval processing that corresponds to a respective one of the payment methods (step 108). Upon completion of the approval processing, a reply to accept the request for purchase is made with respect to the supplier's side server 22 (step 109). Then, it is displayed on the screen of the user 10's side computer apparatus 11 that the request for purchase has had its procedure completed. Then, when the reply to accept the request for purchase is made in step 109, within the supplier 20 the goods-forwarding part 23 performs an order-acceptance processing (step 110). The supplier 20 causes the item of goods, the order for which has been accepted, to be forwarded from the goods-forwarding part 23 to the user 10 (step 111).

Meanwhile, when it has been determined in step 107 that the payment on-credit has been selected, the credit company's side performs simulation of the terms of the credit payment that was at that time requested by the user's side. The simulated result is transmitted from the credit company's side server 31 to the supplier's side server 22. It thereby causes the simulated result to be displayed on the screen of the user 10's side computer apparatus 11 (step 121). For more detail, according to, for example, the selected number of times, there are displayed the amount of money paid per one time and the detailed information on the dates such as the day on that payment is started or the day on that payment is made per one payment time. Except for this, it may be arranged to simultaneously display the amount of money for the applied commission, the amount of money for the interest rate therefor, or in addition the amount of money paid altogether.

On this screen for simulation, the user confirms the state of payment. And if the user admits that the confirmed contents are all acceptable for him, he operates this computer apparatus 11 to thereby perform an operation for finally deciding the method of payment (step 122). If the user stops making his payment that stands on his confirmed conditions, he performs stop processing. Thereafter, the user turns back to the step 106, in which he inputs another method of payment.

When in step 122 there has been performed the operation of finally deciding the payment method with respect to that simulation has been performed, it is determined whether the purchase made on credit is for the first time (step 123). At this time, according to the previous purchaser's information confirmed in step 105 it is determined that the present purchase is not an initial one in step 103.

In case it has been determined in step 123 that the present purchase is an initial one on-credit, the credit company's side causes an image screen, requesting the user to agree with it about an investigation into the user's credit information, to be displayed on the screen of the user's computer apparatus 11 (step 124). The server 31 determines whether the user agrees with it about that matter (step 125). If the server 31 gets no agreement, it ends the purchase processing. If otherwise, the server 31 causes an image screen, on which the request for purchase through means of credit is made, to be displayed on the computer apparatus 11 (step 126). According to the input with respect to the display of that request screen, the server 31 determines whether the occupation has written therefor a housewife or a student (step 127). If the occupation is a housewife or student, the server 31 causes an auxiliary requesting image-screen, on which the requester inputs its husband or protector, to be displayed on the computer apparatus 11 (step 128).

Then, in case the occupation is in step 127 not a housewife or student and in case there is completed the input with respect to the auxiliary requesting screen in step 128, the server 31 causes an image screen, showing the message that the purchasing request is agreed to it, to be displayed on the computer apparatus 11 (step 129). The to-request agreement message that is displayed as above is, for example, "Thank you for your request to buy our goods. About the acceptance, we would send it to you later from our sales company by mail. About the confirmation of the contents on the matter of credit, we would inform it to you from our credit company by telephone." After this to-request agreement message has been displayed, the server 31 causes the supplier's side server 22 to execute provisional order-acceptance processing for the request item of goods (step 130). At the same time, it causes an image screen, on which the credit company's side makes a reply to accept the user's purchasing request, to be displayed on the screen of the user's side computer apparatus 11 (step 131). As the image screen on which the credit company's side makes a reply to accept the user's purchasing request, there is for example displayed like this. "Thank you very much for your requesting buying our item of goods. We would hand it over to you later on." Incidentally, in case the user's requesting procedures that have been taken by this point in time are incomplete and in case the user therefore does not have his purchasing request accepted, there is for example displayed like this. "Thank you for your having requested purchase. But we're sorry to say that another method of payment should be used for your present request for purchase."

Also, the processings that after the to-request agreement message has in step 129 been displayed are executed on the side of the credit company 30 are as follows. They include investigation that concerns the contents of the user's purchasing request. Namely, for example, using the storage data of the database 40, having stored thereon the investigation data, that is connected to the server 31, the credit company performs investigation on the circumstances where the credit the user requested to utilize was being utilized (step 141). According to the investigation result, the credit company determines as the result of the first examination whether the user has become able to utilize the credit (step 142). Here, in case the result of the first examination has been that the user's utilization of credit is unqualified, the credit company does not admit the user's utilization of the credit. Also, in case it has been determined as the first examination in step 142 that the user has become able to utilize the credit, the credit company confirms the user's intention to purchase by a telephone communication made with respect to the requester (i.e. the user) (step 143). The credit company thereby determines, through the confirmation operation that is the second examination, whether the user has become able to utilize the credit purchase (step 144). In case the utilization of credit has become unqualified here, the credit company does not accept the utilization of credit. Also, in case it has been determined through the second examination in step 144 that the utilization of credit has become qualified, the printing part 33 inside the credit company 30 prints out a written contract of credit the opponent party of that is the user. The thus printed-out written contract is sent to the user (step 145). The written contract sent at that time is arranged to include a written contract that has the effect that the credit company side accepts the payment on-credit and, in addition, account-of-bank, etc. transfer request papers.

After the written contract has been sent in step 145, the credit company side determines whether that written contract has been sent back to the credit company by having had necessary items properly entered on the user's side (step 146). Assume here that the written contract that has been recovered by a recovery-input part 34 of the credit company be properly written in, whereby the credit contract has been concluded. Then, the flow proceeds to step 110, in which the goods-forwarding part 23 inside the supplier 20 executes formal order-acceptance processing. Then, the credit company side causes the item of goods, the order of that was accepted in step 111, to be forwarded from the goods-forwarding part 23 to be user 10. In case it has been determined in step 146 that, even after the lapse of somewhat reasonable length of term, the written contract is impossible to recover, the credit company side determines that the user's request for credit purchase has failed to be concluded. Then, the credit company side informs that effect to the supplier side.

Also, when it has been determined in step 123 that the present user is the one who has the experience of utilizing the on-credit purchase in the past, the credit company's side causes the attributes, such as the contents set at the time of the previous purchasing request, to be displayed on the screen of the computer apparatus 11 according to the past information built up on the server 31 (or server 22) (step 151). At this time, the credit company's side causes, for example, the name of the banking system at the time of the previous utilization to be displayed. And it is determined whether user's input has been performed of correcting the displayed contents (step 152). When correaction has been done, the changed items of information are input by the user and setting thereof is done (step 153). And both when no correaction has in step 152 been performed and after the changed information items have in step 153 been input, the credit company's side causes a user's request-acceptance message to be displayed on the screen of the computer apparatus 11 (step 154).

And, after that user's request-acceptance message has been displayed, the flow proceeds to the step 110. Thereby, formal order-acceptance processing is executed in the goods-forwarding part 23 inside the supplier 20. Thereby, the credit company's side causes the item of goods, having been order-accepted in step 111, to be forwarded from the goods-forwarding part 23 to the user 10. It is to be noted, regarding the confirmation or correaction processing executed from step 151 to step 154 about the user having the experience of buying before, that it may be simultaneously executed when executing the confirmation processing of the purchaser from step 103 to step 105.

Through the execution of the above-described processes, it is possible to purchase an item of goods on a credit-payment, etc. basis by operating the user's side terminal apparatus (computer apparatus) connected via a relevant Internet communication network. Next, the detail of a respective one of the processes that have so far been described above will be explained.

Figure 3:
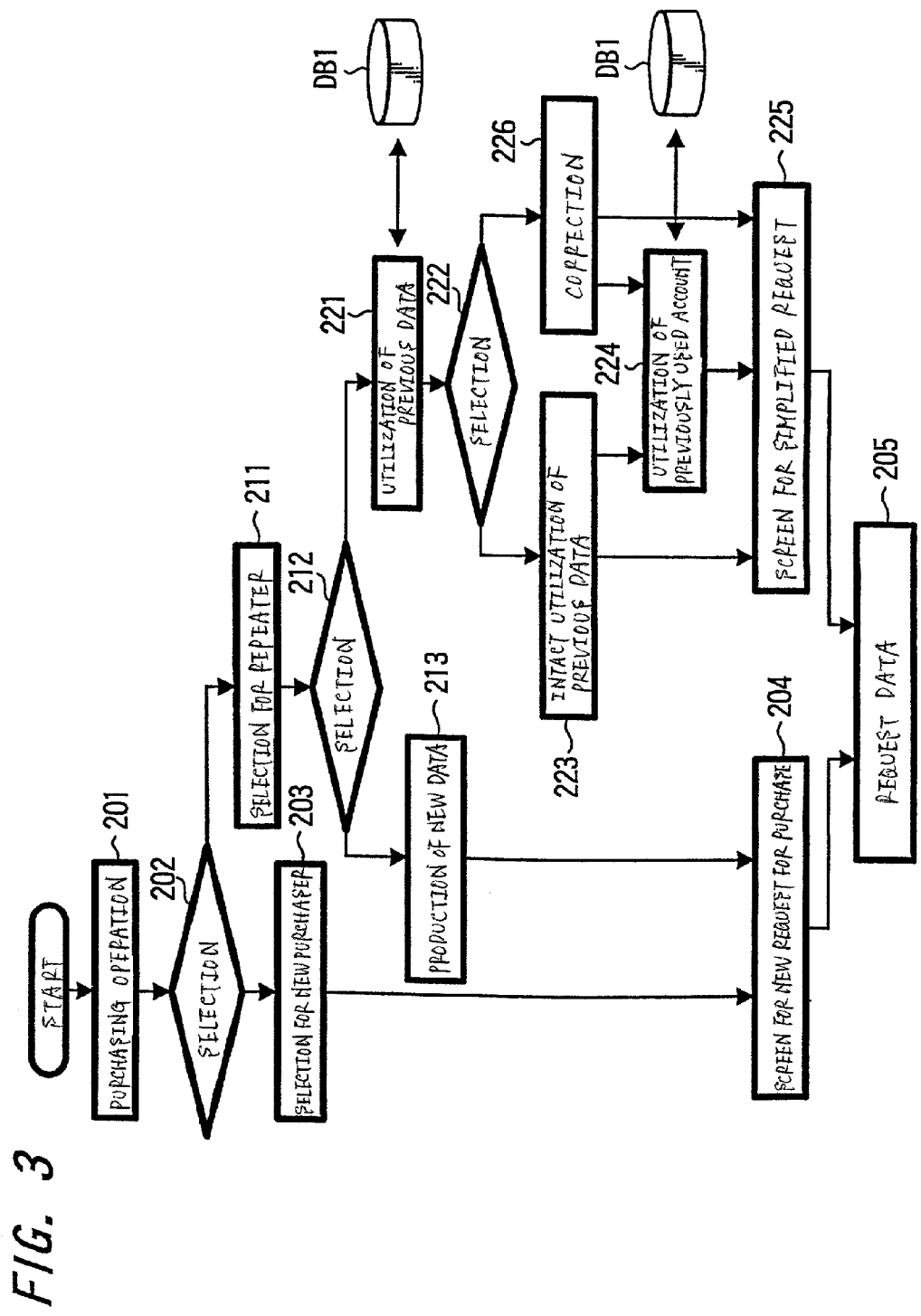
FIG. 3 is a flow chart illustrating the goods-item purchase request process according to the embodiment of the present invention.

First, the detail of the operation and display when the user (the person who does his on-line shopping) makes his purchasing request in the step 103 to the step 105 in the flow chart of FIG. 1 will be explained with reference to a flow chart of FIG. 3.

When the user has performed, by the user's side computer apparatus 11, the operation of making a request to purchase an item from the items of goods listed on the supplier's side Web site 21 (step 201), the following image screen is displayed the next on the computer apparatus 11. Namely, the image screen for inquiring whether that user is a new purchaser or a repeater who has the experience of purchasing in the past is displayed. By this display, the supplier's side causes the user to select which one of them (step 202). It is to be noted that in case the user is a repeater, the supplier's side also causes him to input part of his personal data and the password at the same time. Here, when the server 22's side determines that the operation of that the user is a new purchaser has been performed (step 203), the server 22's displays an image screen for permitting the user to input necessary particulars a new purchaser needs to write in (step 204). Thereby, the server 22's side obtains the requesting data (step 205).

Also, the server 22's side determines in step 202 that the user's input operation is for a repeater (step 211), the server 22's side causes an image screen, inquiring whether the user uses his previous data or newly inputs relevant data, to be displayed on the computer apparatus 11. Thereby, the server 22's side causes the user to select which one of them (step 212). Here, when the server 22's side has determined that the user has selected newly inputting his data (step 213), the flow proceeds to step 204. Thereby, the server 22's side causes an image screen, causing the user to input with respect to all necessary particulars the same as those in the case of a new purchaser, to be displayed.

Also, when the server 22's side has determined in step 211 that the user has selected using his previous data (step 211), the trader's side reads out the user's previously used data that is stored in the database DB1 prepared on the credit company's or supplier's side server 31, 22. Thereby, it causes that previously used data to be displayed on the image screen of the computer apparatus 11 (step 221). At this time, as has been explained in connection with the flow chart of FIG. 2, it causes only the input items, having the possibility of being corrected, to be displayed.

At this stage where that display is made, the trader's side causes the user to select whether he uses the data he previously used as it is (step 222). In case by this selection the user uses the data he previously used (step 223), the trader's side uses the user's data such as the account of bank he previously used as it is. Thereby, it executes the processing for the performance of the credit payment (step 224) and causes a simplified request image screen causing the user to only make his confirmation to be displayed on the computer apparatus 11 (step 225). Thereby, it obtains the user's request data in step 205 (step 205).

Also, in case the user corrects the data he previously used (step 226), the trader's side confirms the contents the user has corrected. Then, it causes a simplified request image screen to be displayed on the computer apparatus 11 (step 225), and it obtains the request data in step 205 (step 205).

FIG. 4 is an illustration that is made of an example of the display at the time of the use of the previous data in step 221. However, in FIG. 4, the columns in which the data such as the name, address, etc. are displayed are kept blank and, actually, in those columns, letters or numerals are input. For more detail, they include the display column in which the name is displayed in kana letters, the display column in which the name is displayed in kanji, the display column in which the existence or non-existence of the spouse is displayed, the display column in which the address of the user's own home is displayed, the display column in which the telephone number(s) are displayed, the display column in which the user's place of employment is displayed, the display column in which the address of the user's place of employment is displayed, the display column in which the telephone number of the user's place of employment is displayed, the display column in which the user's yearly length of service is displayed, the display column in which the user's form of residence is displayed, the display column in which the user's yearly length of residence, and the display column in which the name of the banking system the user previously used is displayed. Thereby, data having relevancy to each display column is displayed. In this example of display, the image screen displays "If any changes occur, correct by overwriting. If no changes occur, click the confirmation buttons as the displays are at the lefts of the relevant items."Thereby, in case any changes occur, the user is requested to input the changed data. In case changing the account of the banking system the user uses, he is requested to click the change button that is located under the name of the banking system. Thereby, another image screen for user's inputting the account is displayed.

Figure 5:
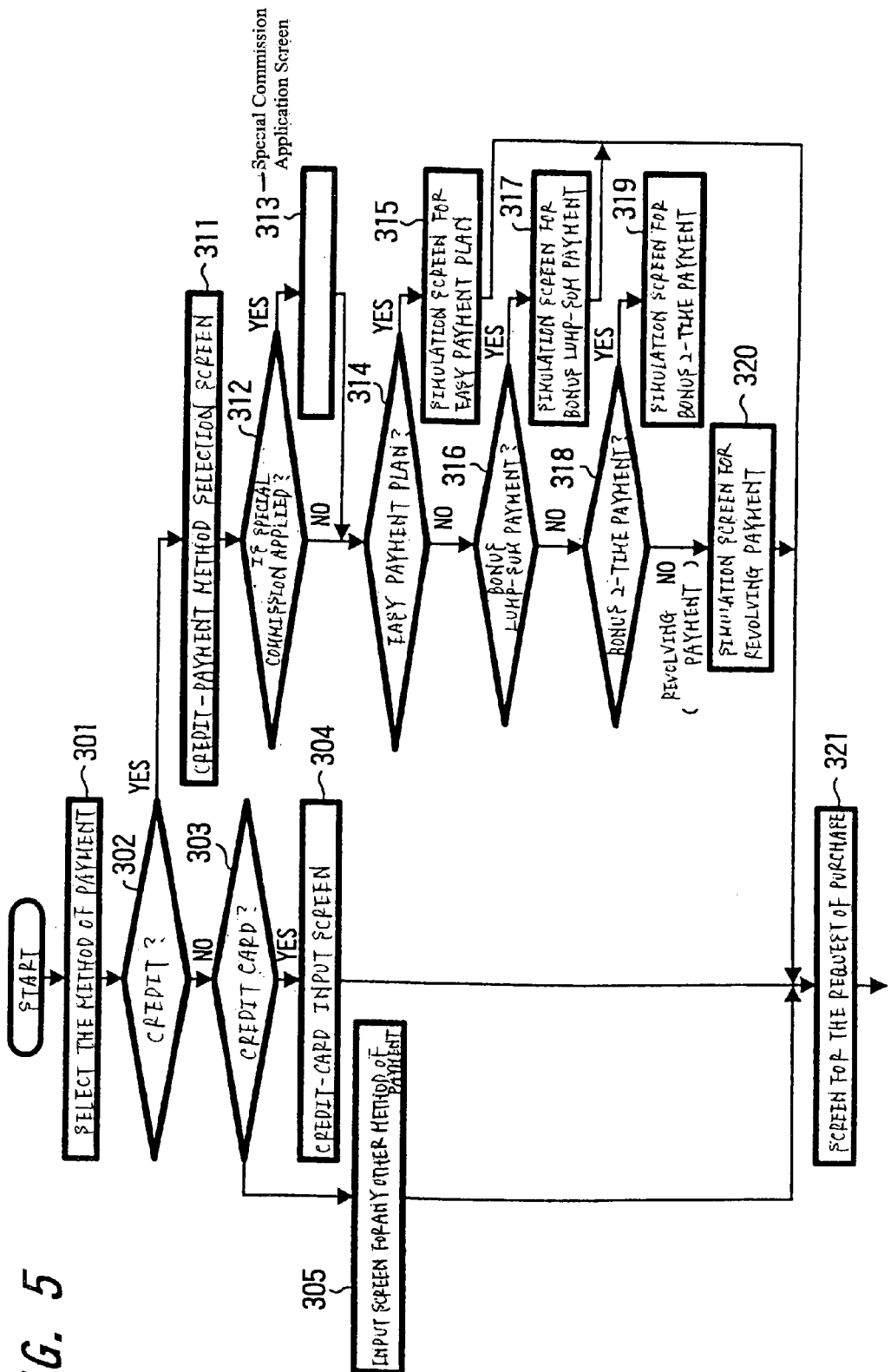
FIG. 5 is a flow chart illustrating an example of the selection process for selecting the method of payment according to the embodiment of the present invention.

Next, the details on the selection process for selecting the method of paying that was shown in step 106 of the flow chart of FIG. 1 as well as on the simulation process when by that selection the credit payment has been selected will now be explained with reference to a flow chart of FIG. 5.

First, when the trader's side causes an image screen for selecting the method of payment to be displayed (step 301), the server's side determines whether the credit payment has been selected by the user's input with respect to that image screen (step 302). When the method of payment other than the method of credit payment has been selected, the server's side determines whether the payment based on the use of a credit card has been selected (step 303). Here, in case the payment made using a credit card has been selected, the server's side causes an image screen for causing the user to input the items such as the number of the credit card or the term of validity thereof to be displayed (step 304). When the user has input these relevant items, an image screen indicating that the method of payment has been input is displayed (step 321).

Also, when the server's side has determined in step 303 that the method of payment other than the payment made using a credit card has been selected, it causes a display of the input screen corresponding to a respective one of the methods of payment (step 305). And, when a relevant item has been input from the user's side, the server's side displays an image screen on which that relevant method of payment has been input (step 321).

When the server's side has determined in step 302 that the payment on credit has been selected, the server's side causes an image screen for selecting the method of payment on credit to be displayed on the user's side computer apparatus 11. It then causes the user to input a detailed method of payment on credit on that image screen (step 311). Here, the server's side determines whether the item of goods the user is requesting to buy is the one for which a special commission (or interest rate) is applied or the user uses the supplier (step 312). In case that special commission or interest rate is applied, the server's side causes an image screen showing the application of that special commission to be displayed (step 313). After the processings in the steps 312 and 313, there is executed the simulation process with respect to every one of the selected methods of payment.

Namely, the server's side determines whether the easy payment plan has been selected (step 314). When the easy payment plan has been selected, the following simulation image screen is displayed. That is, the simulation screen showing the detail in the case of paying the price of the purchased item of goods at the selected division frequency on that selected easy payment plan, such as the amounts paid or payments date (step 315). Also, the server's side determines whether bonus lump-sum payment has been selected (step 316). When bonus lump-sum payment has been selected, the following simulation image screen is displayed.

That is, the simulation screen showing the detail in the case of paying the price of the purchased item of goods in a bonus lump sum, such as the amounts paid or payments date (step 317). Also, the server's side determines whether bonus 2-time payment has been selected (step 318). When 2-time payment made from bonus has been selected, the following simulation screen is displayed. That is, the simulation screen showing the detail in the case of paying the price of the purchased item of goods with the bonus 2-time payment, such as the amounts paid or payments dates (step 319). Further, when revolving payment has been selected, the following simulation screen is displayed. That is, the simulation screen showing the detail in the case of paying the price by revolving payment, such as the amounts paid or payments dates (step 320). And, after completing the confirmation performed of the above-described simulation screens, the service side causes an image screen, showing that the method of payment has been input, to be displayed (step 321).

Incidentally, the credit company's side screen 31 has registered therein beforehand data for being used to set the commission, interest rate, etc. every supplier or goods-item. It is thereby arranged, when a request for payment on-credit has arisen, to perform simulation, etc. according to that registered data.

Figure 6:
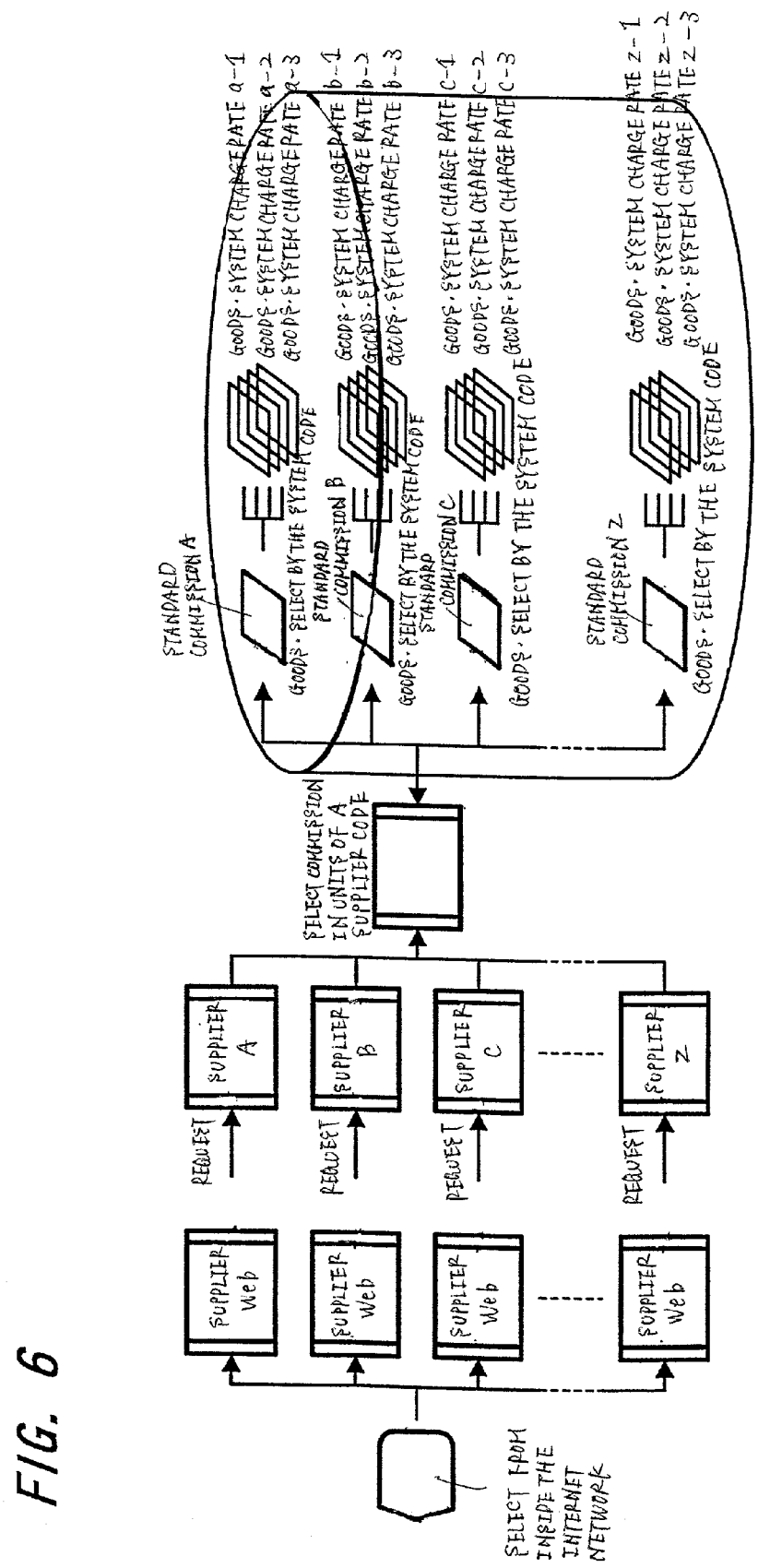
FIG. 6 is an explanatory view illustrating an example of the commission selection process according to the embodiment of the present invention.

FIG. 6 is an illustration made of examples of the process in which a commission is paid every supplier. When it is assumed that those suppliers that each use its relevant credit company exist from a supplier A to a supplier Z, from a standard commission A to a standard commission Z are determined, respectively, with regard to those suppliers A to Z beforehand. Further, according to the supplier, the system charge rate is individually set in units of a goods-item. The server 31 has supplied thereto a supplier code and a goods-item code from the server 22 of the supplier by that a request for performance of the simulation has been made. According to those codes, the server 31 selects the commissions, etc. therefor and, using those selected commissions, etc., performs relevant simulation.

Through the execution of the above-explained process, it is possible for the user to perform on-line shopping. For this reason, it becomes possible for the user to select a method of payment freely given to him from among various kinds of payment methods that include the payment on-credit. In this case, in case the user has selected the on-credit payment, there is the need to cause the user to input a lot of necessary particulars. However, in the case of a user who has the experience of using that before, it is performed to use the data built on the database connected to the credit company or supplier. Namely, by making use of that data, the contract processing can be executed. So it is possible to realize relevant payment such as a credit payment through the performance of the simple input operation. In this case, because a password is set per user and this password is simultaneously input, identifying the user can be reliably done.

Also, in the case of the on-credit payment, the exchanges of the written contract are necessary. However, when the utilization of the on-credit payment has been requested by the user, it is arranged that the written contract be automatically sent to the user. Therefore, the processings for the conclusion of the contract can be executed reliably and promptly. Further, in the case of the repeater having the experience of already signing the written contract for conclusion of it, the on-credit payment is executed by utilizing the written contract the exchanges of that were performed before. Therefore, new exchanges of the contract become necessary. This enables the prompt execution of the on-credit payment involved.

In addition, when the user who has the experience of utilizing the payment on-credit before requests the utilization of new on-credit payment through the use of the data at the time of the previous utilization, the user is only caused to confirm the items the changes of that might occur. And, the user is only caused to correct them according to the necessity. Therefore, when confirming, it is not necessary to cause the user to confirm all the items to be written in. Therefore, the user can simply perform his requesting operation.

Also, when the user has selected the payment on-credit, the server's side performs relevant simulation with respect to the amounts paid, payments dates, etc. according to the contents involved in the request made at that request. Then, the server's side has caused the simulated result to be displayed on the user's side terminal apparatus. Therefore, when purchasing, the user becomes able to confirm the exact payment circumstances.

Figure 7:
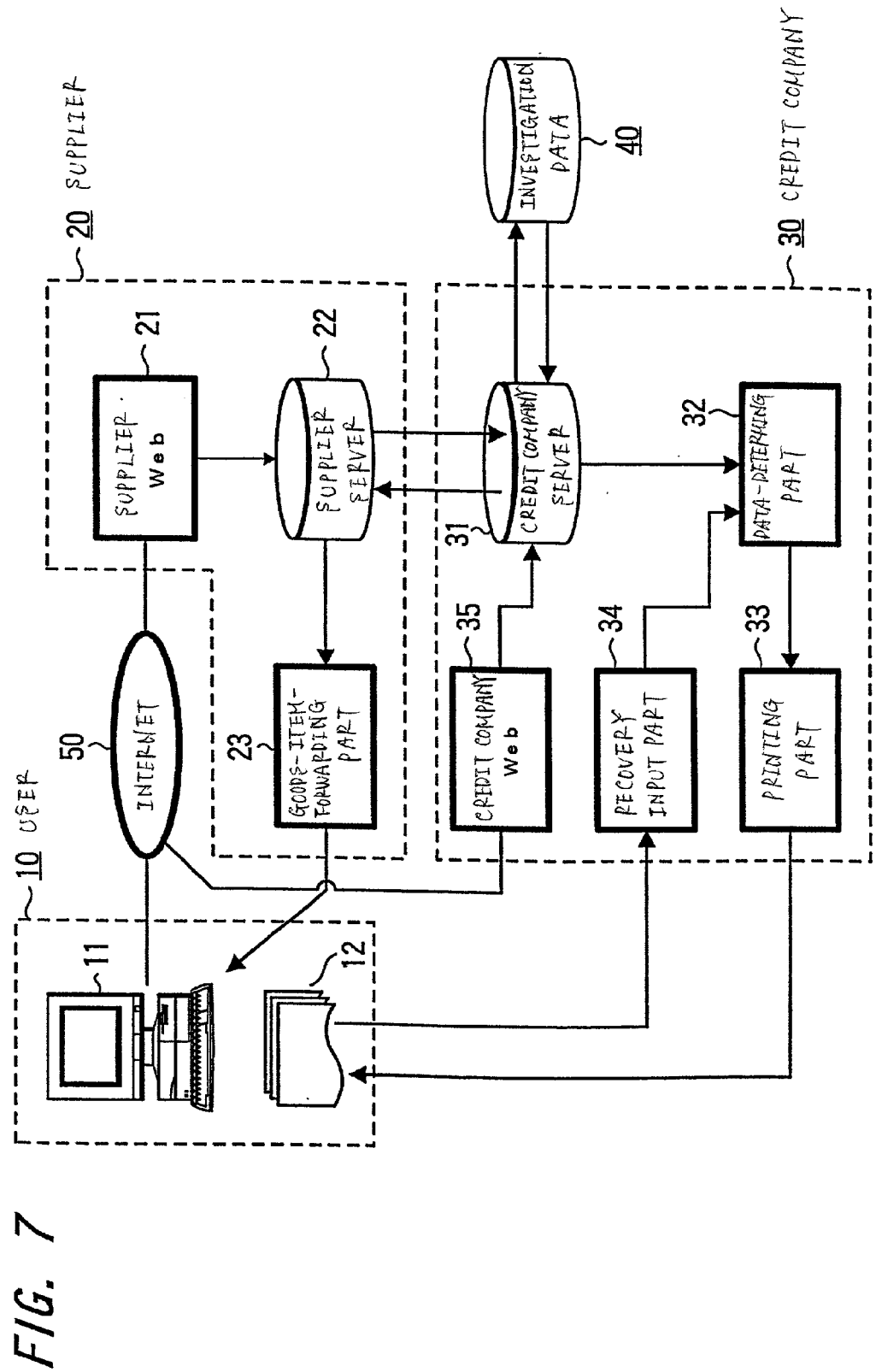
FIG. 7 is a block diagram illustrating an example of the system construction according to another embodiment of the present invention.

Additionally, in the above-described embodiment, as the system construction for making connection between the supplier side and each of the supplier and credit company, there has been adopted the form wherein the user's side terminal apparatus and the supplier's side Web site are connected via Internet means of communication. And, the connection between the supplier and the credit company has been made through the utilization of the single-purpose lines. However, it may be arranged to utilize the credit company's side Web site. Namely, as illustrated in, for example, FIG. 7, it may be arranged to prepare a Web site 35 also on the side of the credit company 30 as well. Thereby, the supplier's side Web site 22 and the credit company 30's side Web site 35 may be linked with each other. Thereby, the user's side terminal apparatus 11 and the credit company 30's side Web site 35 may also be connected with each other via Internet communication means 50. On the other hand, regarding the process on payment, etc. that concerns the simulation, etc. for realizing the on-credit payment, the credit company's side server 31 may directly execute it by way of that credit company's side Web site 35. It is to be noted that in FIG. 7 other portions are constructed in the same way as those in the case of the system construction illustrated in FIG. 1.

Also, in the above-described embodiment, the exchanges of the written contract that when the user has selected the utilization of the on-credit payment are executed have been executed as follows. Namely, the printed written contract is sent from the credit company to the user's side. Then, after signing that contract, the user has been arranged to send it back to the credit company. However, the following method can also be taken. Namely, instead of sending to the user, the data on the written contract may be transmitted to the user 10's side terminal apparatus 11 via the Internet lines. Then, that data may be printed out through the user's operation by the use of the printer apparatus (not illustrated) connected to the terminal apparatus 11. Thereafter, the written contract after the user has signed the printed-out written contract may be sent back to the credit company.

Further, in the above-described embodiment, regarding the repeater having the experience of already concluding the contract with use of a written contract, the on-credit payment has been executed utilizing the written contract that was previously concluded. However, in the case where there is the need to conclude a new written contract at each time of purchase in view of the limitations imposed thereon by the relevant laws or regulations, it may be arranged to temporarily execute the relevant process under the assumption that the on-credit payment has been established according to the contents of the written contract previously exchanged (and according to the contents the user renewed his input at the time of the conclusion of that contract). Thereafter, for example, it may be arranged to send the relevant written contract simultaneously with the shipment of the purchased item of goods, and for the user to confirm the conclusion of the contract.

Also, in the above-described embodiment, it has been arranged that the connection between the user's side terminal apparatus and the supplier or credit company be performed through an Internet line such as the telephone lines. However, it may be arranged that both of them be connected to each other through other communication means.

The present invention is utilizable for the technique of purchasing the goods-items via a network such as an Internet communication network.

The invention claimed is:

1. A method for purchasing an item using a terminal apparatus connected to a supplier server through a communication line, the method comprising:
   accumulating data associated with a user request to purchase the item at a plurality of supplier servers;
   contacting, by the plurality of supplier servers, a credit company server to obtain a credit contract associated with the user request to purchase the item;
   accessing, by the credit company server, a database having standard commissions and item charge rates associated with each of the plurality of suppliers associated with the plurality of supplier servers;
   determining, at the credit company server, whether the user is authorized to receive credit for purchasing the item;
   setting, at the credit company server, an interest rate based on the item being purchased;
   calculating, at the credit company server, a term of payment for each supplier associated with the plurality of supplier servers based on the standard commissions and item charge rates associated with each supplier and the interest rate;
   simulating at the terminal apparatus the calculated term of payment for the suppliers associated with the plurality of servers;
   creating the credit contract including one of the calculated terms of payment; and
   sending the credit contract from the credit company server to the user if the user is authorized to receive credit for purchasing the item.

2. The method of claim 1, further comprising sending a notification from the credit company server to the supplier server indicating that the user is authorized to purchase the item if the user is authorized to receive credit for purchasing the item.

3. The method of claim 1, wherein the determining step further includes communicating with a database having credit information relating to the user.

4. The method of claim 1, further comprising sending a notification to the user indicating denial of credit for purchasing the item if the user is not authorized to receive credit for purchasing the item.

5. The method of claim 4, further comprising sending a notification from the credit company server to the supplier server indicating that the user is not authorized to purchase the item if the user is not authorized to receive credit for purchasing the item.

6. The method of claim 1, further comprising providing the user with credit payment options including the frequency of payments associated with purchasing the item if the user is authorized to receive credit for purchasing the item.

7. The method of claim 1, further comprising providing the user with credit payment options including the amount of each payment associated with purchasing the item if the user is authorized to receive credit for purchasing the item.

8. The method of claim 1, wherein the setting step further includes associating an interest rate with the credit contract based on the identity of the user.

9. The method of claim 1, wherein the sending step further includes printing the credit contract and sending the printed credit contract to the user.

10. The method of claim 1, wherein the sending step further includes transmitting an electronic copy of the credit contract to a terminal apparatus associated with the user.

11. The method of claim 10, further comprising the user applying a digital signature to the electronic copy of the credit contract and transmitting the signed electronic contract to the supplier server.

12. A method for electronic purchase of a good, comprising:

selecting a credit payment method for the good being purchased using a user terminal coupled to a plurality of supplier servers;

accessing, by the credit company server, a database having standard commissions and goods codes associated with each of the supplier servers;

setting, at the credit company server, a first interest rate based on the type of good being purchased;

calculating, at the credit company server, a credit payment method for each of the supplier servers based on the first interest rate and the standard commissions and goods codes associated with each of the supplier servers, each credit payment method including a payment frequency and a payment start date;

providing the credit payment method associated with each supplier to the user terminal; and requesting, by one of the plurality of servers, that a user associated with the user terminal agree to one of the credit payment method including the payment frequency and start date.

13. The method of claim 12, wherein the determining step further includes transmitting information associated with the user to the credit company server.

14. The method of claim 13, further comprising determining, at the credit company server, a second interest rate associated with the good being purchased based on the information associated with the user and requesting that the user agree to the second interest rate as part of agreeing to the credit payment method.

15. The method of claim 12, further comprising transmitting a contract to the user terminal when the user indicates acceptance of the credit payment method.

16. The method of claim 12, wherein the determining step further includes determining if the user is a student or a housewife.

17. The method of claim 12, wherein the determining step further includes determining if the user has previously purchased another good from a supplier associated with the server.

* * * * *